United States Patent [19]

Greenburg

[11] Patent Number: 4,834,571
[45] Date of Patent: May 30, 1989

[54] UNIVERSAL WIRE LOCK

[76] Inventor: Jonathan G. Greenburg, 5460 White Oak Ave., E-213, Encino, Calif. 91316

[21] Appl. No.: 229,131

[22] Filed: Aug. 5, 1988

[51] Int. Cl.⁴ .......................... F16B 1/00; F16G 11/00
[52] U.S. Cl. ..................................... 403/214; 403/229; 403/303; 403/105; 439/252; 439/413; 439/884; 174/845; 174/90
[58] Field of Search ............... 403/105, 229, 214, 215, 403/303; 439/252, 413, 884; 174/87, 84 R, 90, 84 S; 81/60

[56] References Cited

U.S. PATENT DOCUMENTS 1,705,964  3/1929  Dempsey .............................. 174/91
3,156,761  11/1964  Schinske ............................. 403/214

Primary Examiner—Randolph A. Reese
Assistant Examiner—Franco S. DeLiguori
Attorney, Agent, or Firm—Cislo & Thomas

[57] ABSTRACT

An improved connector having a looped wire retained in one piece of the connector and providing a second piece having a concentric bore and able to engage a free end of said looped wire to cause the wire to constrict upon rotation of the second piece relative to the first piece to bind wires inserted through the second piece into a receptacle of the first piece.

9 Claims, 1 Drawing Sheet

UNIVERSAL WIRE LOCK

BACKGROUND OF THE INVENTION

This invention relates to connectors and is particularly directed to universal locks for connecting string or wire and directed to connecting electrical wires. Present wire locks are not universal. They only work on straight wire, of similar diameters when the right size wire lock is used. They do not work for braided wires, a combination of braided and straight wires, straight wires of significantly different diameters (gauges) or when the wrong size wire lock is used.

In an application like electrical appliances or equipment and in running electrical circuits, it is often necessary to connect the ends of two wires together. Frequently, such connections are made using a binding material, such as solder. However, soldering requires proper tools, electrical energy, reinsulating the wires, and considerable skill. Consequently, soldering is not an appropriate method of connection for many purposes.

In other instances, solderless connections may be used. When this is done, care must be taken to assure that adequate electrical contact is established and maintained between the two wires, both during and subsequent to the joining operation. In the past, this was accomplished by stripping the insulation from the ends of the two wires, manually twining the wires together and wrapping the connection with electrical tape. Unfortunately, it was often found that the wires were inadequately twined or had somehow become unwound or separated, so that the electrical connection was sporadic or non-existent.

More recently, wire locks have been proposed comprising generally cup-shaped members into which the ends of the wires to be connected were inserted and, by holding the wires in one hand and rotating the lock with the other, the wire ends become twined and the connection made. However, it has frequently been found that one of the wires was not fully inserted into the lock or slipped during the rotation of the lock so that the desired electrical connection was not achieved. Furthermore, wire locks of the prior art have sometimes become loosened, due to vibration or other causes, with the result that the wires have become separated causing loss of electrical connection and possible short circuits and fire hazards.

A search in the U.S. Patent Office has revealed the following patents:

| U.S. PAT. NO. | INVENTOR | ISSUE DATE |
| --- | --- | --- |
| 1,705,964 | J. B. Dempsey | Mar. 19, 1929 |
| 2,656,204 | J. H. Blomstrand | Oct. 20, 1953 |
| 2,977,403 | M. W. Reitz | Mar. 28, 1961 |
| 3,067,401 | C. R. Rhodes | Dec. 4, 1962 |
| 3,109,051 | A. L. Vogel | Oct. 29, 1963 |
| 3,163,904 | R. P. Ziolkowski | Jan. 5, 1965 |
| 3,347,979 | N. E. Hoffman | Oct. 17, 1967 |
| 3,440,335 | J. H. Blomstrand | Apr. 22, 1969 |
| 3,469,020 | C. M. Broom et al | Sep. 23, 1969 |
| 4,739,470 | D. Eppler | June 19, 1974 |
| 4,107,453 | B. Erixon | Aug. 15, 1978 |
| 4,163,868 | H. D. Stotts | Aug. 7, 1979 |

The patent to Dempsey, U.S. Pat. No. 1,705,964, discloses a connector comprising two relatively rotatable parts indicated in that patent as 1 and 2 between which are coupled at least one wire 11. As shown in that patent's FIG. 3, the wires 12 to be joined by the connector are inserted into the central opening 3, and the two members 1 and 2 are rotated, one relative to the other, to twist the wire 11 around the connectors. However, the structure of the Dempsey connector is vastly different from that of the present invention and would be subject to slippage, as described above.

The patent to Broom et al, U.S. Pat. No. 3,469,020, is directed to an electrical spider connector wherein each of the conductors 3 have their stripped ends 5, 6 and 7 wrapped with wire at locations 8. However, the wire which wraps the conductors is not coupled to the conductor, as is done in the present invention.

The patent to Vogel, U.S. Pat. No. 3,109,051, is directed to an electrical wire connector 10 comprising a twisting cap 11, a locking element 12 and a lower member 13. The locking element 12 is located intermediate the twisting cap 11 and lower member 13, with lower member 13 being bonded by adhesive means to the twisting cap 11. The bared ends of conductors 18, 19 and 20 are threaded through elongated slots 12a and 12b of the locking element 12 and upwardly into cap 11, so that, when the conductors are grasped and twisting cap 11 is turned, with locking element 12 being stationary, the bared ends of the conductors are forcibly twisted together. The Vogel connector is somewhat similar to that of the present invention, except that Vogel has his twisting cap 11 adhesively bonded to his lower member 13. However, this means that the user must grip the conductors to be joined with one hand and twist the connector with the other hand. This still permits slippage of one conductor with respect to the other. With the device of the present invention, both conductors are inserted into the connector and the user holds them against the bottom part of the connector while the upper part is rotated to make the connection. In this way, slippage between the conductors is prevented.

The Stotts patent, U.S. Pat. No. 4,163,868, discloses a connector having a base 10 and a cap 11 which are threadedly coupled to each other, but are permitted to rotate in only one direction. The cap 11 includes a plurality of teeth 22 which project downwardly toward the base 10 and are positioned to cooperatively interfit with the circular ratchet 18 of the base 10. Conductor wires 30 are inserted through the holes 15 in the base member 10 and upward through the insulation cutter 12 positioned in the cap 11. The cap and base are then rotated, relative to each other, in the direction permitted by the ratchet 18 and teeth 22.

The Rhodes patent, U.S. Pat. No. 3,067,401, teaches a connector having a wire braid 1 located within a plastic sleeve 10. Pins 4 and 5 are inserted within the braid 1 to accomplish the electrical connection. However, no twisting or wrapping of the wires, subsequent to insertion of the pins 4 and 5, is used to make the connection.

The remaining patents located in the search are of general interest only. Thus, none of the prior art connectors teaches easy or convenient means for making and unmaking electrical connections. Consequently, none of the prior art connectors have been entirely satisfactory.

SUMMARY OF THE INVENTION

In contrast, the present invention discloses a solderless connector having a looped wire retained in one piece of the connector and providing a second piece having a concentric bore and able to engage a free end of said looped wire to cause the wire to constrict upon rotation of the second piece relative to the first piece to bind wires inserted through the second piece into the receptacle of the first piece. To disconnect the wires, the two pieces acting as one can be rotated in an opposite direction to facilitate release.

Accordingly, it is an object of the present invention to provide an improved connector.

Another object of the present invention is to provide an improved solderless connector which does not require the user to hold the wires to be joined in one hand while trying to attach the connector with the other hand.

A further object of the present invention is to provide a connector which can easily bind two or more wires or strings together, yet can permit the wires to be released with equal ease.

A specific object of the present invention is to provide an improved solderless connector having a looped wire retained in one piece of the connector and providing a second piece having a concentric bore and able to engage a free end of the looped wire to cause the wire to constrict upon rotation of the second piece relative to the first piece to bind the wires inserted through the second piece into the receptacle of the first piece. To disconnect the wires, one merely rotates the connector in an opposite direction while holding the wires.

A major advantage is to eliminate the need for assorted sizes of connectors. It will work equally well on 80–100% of normally used wires. Another advantage is it will work on all types and combinations of wires, i.e. straight, braided, or any combination thereof. Present ones *do not*. Also, wires will not have to be pretwisted before insertion as is required with presently used connectors.

These and other objects and features of the present invention will be apparent from the following detailed description, taken with reference to the accompanying drawings.

DETAILED DESCRIPTION OF THE INVENTION

Figure 1:
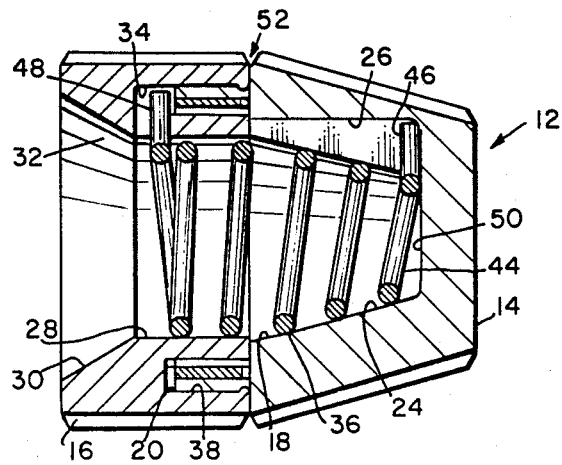
FIG. 1 is an elevational cross-sectional view through a connector embodying the present invention.

In that form of the present invention chosen for purposes of illustration in the drawings, FIG. 1 shows a connector, indicated generally at 12, having a top member 14 and a bottom member 16. The extension of the top and bottom member 14 and 16 may have knurled surfaces for ease of gripping.

Figure 2:
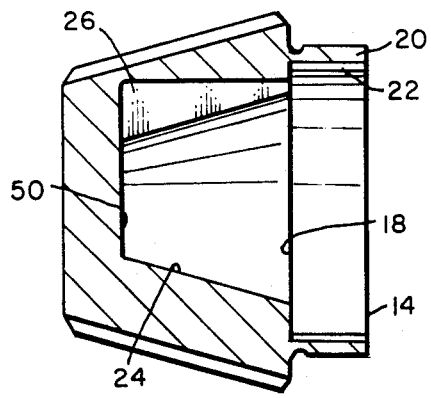
FIG. 2 is an elevational cross-sectional view through the top member of the connector shown in FIG. 1.
Figure 7:
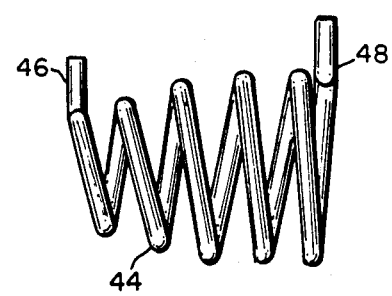
FIG. 7 is a side plan view of the wire element of the connector shown in of FIG. 1.
Figure 3:
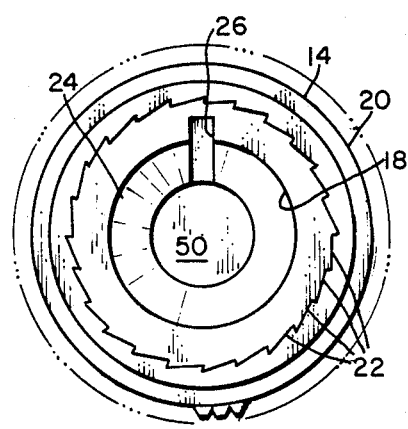
FIG. 3 is a bottom plan view of the top member of the connector shown in FIG. 2.

As best seen in FIGS. 2 and 3, the top member 14 of the connector 12 is a hollow, concave member having a bottom 18 thereof open to permit insertion of electrical conductors for joining and having an annular flange 20 projecting downwardly about the opening 18 formed with a plurality of inwardly projecting serrations 22 extending about the flange 20. The inner surface 24 of the top member 12 is generally conical, sloping upwardly and inwardly, and is provided with a slot 26 extending vertically along one side of the inner surface 24.

The bottom member 16 of the connector 12 is annular having a central opening 28 extending vertically therethrough with an outwardly flanged entry portion 30 adjacent the bottom end 32 thereof. One side of the bottom member 16 is provided with a vertical slot 34 which communicates with the upper surface 36 of the bottom member 16 and terminates just above the inner end of the flanged entry portion 30 of the central opening 28. The bottom member 16 is also formed with an annular recess 38 concentric with the central opening 28 and communicating with the upper surface 36 of the bottom member 16.

Figures 5, 6:
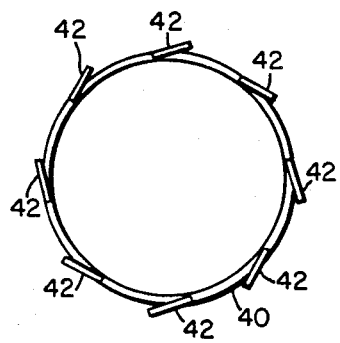
FIG. 5 is a side plan view of the ratchet insert of the connector shown in FIG. 1.
FIG. 6 is a top plan view of the ratchet insert of FIG. 5.
Figure 4:
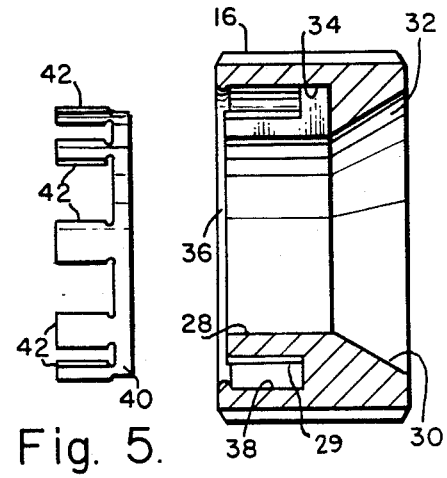
FIG. 4 is an elevational cross-sectional view through the bottom member of the connector shown in FIG. 1.

An annular ratchet member 40 is fixedly mounted within the recess 38 and is formed with a plurality of upwardly projecting plates 42 which extend tangentially outward from the annular member 40, as seen in FIG. 6, to releasably engage the serrations 22 of the top member 14 to permit only one-way rotation of the top member 14 with respect to the bottom member 16. Ratchet member 40 fits within inwardly projecting serrations extending about the flange 38. These serrations with annular member 40 fit together with serrations from top piece 22 like keys in a lock, and allow rotation of top member 14 with the bottom member 16 in one direction only.

Finally, a conically coiled wire 44 is provided conforming generally to the inner surface 24 of the top member 14 and having ends 46 and 48 projecting outwardly for engagement with slots 26 and 34, respectively.

In use, the connector 12 is assembled by inserting the end 46 of wire 44 in slot 26 of the top member 14. Rachet ring 40 is inserted into a recess 29 of the bottom member 16. Flange 20 of the top member 14 is inserted into the recess 38 of the bottom member 16 so that the end 48 of the wire 44 is inserted in slot 34 of the bottom member 16. The ends of a pair of electrical conductors, not shown, which are to be joined are inserted into the connector 12 through opening 28 of the bottom member 16 and are seated against the end 50 of the inner surface 24 of the top member 14. The user can easily hold the conductors in this position, while holding the bottom member 16 of the connector 12 in the same hand. The user can rotate the top member 14 of the connector in a counterclockwise direction which would appear as a clockwise direction viewed from FIG. 3, using his other hand. As the top member 14 is rotated, the wire 44 is caused to wrap about the conductors, since end 46 of the wire 44 is seated in slot 26 of the top member 14, while end 48 of the wire 44 is seated in slot 34 of the bottom member 16. This causes the wire 44 to grip the conductors and to bind them together to form the desired electrical connection. Also, the serrations 22 on the inside of the flange 20 will engage the plates 42 of the ratchet ring 40 to permit only one-way rotation of the top member 14 with respect to the bottom member 16. Consequently, there can be no slippage or undesired movement of the conductors or of the components of the connector 12 while the connection is being made. This assures that firm and continuous contact will be made by the conductor ends and that the desired electrical connection will be achieved.

If it subsequently becomes necessary or desirable to alter or disconnect the conductors, this can be accomplished quickly and easily with the connector 12 of the present invention. To unmake the connection with the connector 12, one holds the wires firmly and rotates the connector 12 in an opposite direction.

Connection can be remade for the same diameter or smaller wires as often as desired. If necessary, to use larger diameter wires, the two halves 14 and 16 can be separated by prying them apart at their junction 52. The wire 44 will expand when the halves 14 and 16 are separated. By lining up the bottom wire end 48 with the bottom half slot 34, the two halves 14 and 16 can be resnapped together with the wires to be joined within.

It will be apparent that numerous variations and modifications can be made to the connector of the present invention without departing from the scope of the invention. Therefore, it should be clearly understood that the form of the present invention described above and shown in the accompanying drawing is illustrative only and is not intended to limit the scope of the present invention.

I claim:

1. A connector for components to be joined comprising:
    an annular bottom member;
        a concave top member rotatably mountable on said annular bottom member and rotatively movable with respect to said annular bottom member; and
        a wire engageable with said top and bottom members for rotation therebetween to grip the components inserted through said bottom member into said top member, wherein said wire is of a unique shape forming a loop whereby the components are passed through said loop.

2. A connector of claim 1 further comprising:
    said top member defining an open end and having an annular flange about said open end thereof and having a plurality of serrations formed about the periphery of said flange;
    a recess formed in the upper surface of said bottom member to receive said flange of said top member; and
    a ratchet ring fixedly mounted in said recess and engageable with said serrations on said flange to permit rotation between said top member and said bottom member in one direction.

3. A connector as claimed in claim 2, wherein:
    said ratchet ring comprises an annular member having a plurality of vertical plates projecting upwardly from said annular member and having portions of said plates extending tangentially to said annular member to engage said serrations on said flange of said top member.

4. A connector as claimed in claim 1, wherein:
    said annular bottom member defining an opening extending axially therethrough and defining an axial slot communicating with said opening and an upper surface to releasably receive a first projecting end of said wire to be retained within said slot when said top member is rotated relative to said bottom member.

5. A connector as claimed in claim 1, wherein:
    said top member defining a vertical slot formed in an inner surface thereof to releasably receive a second projecting end of said wire to be retained within said slot when said top member is rotated relative to said bottom member.

6. A connector as claimed in claim 1, wherein:
    said top member is formed with a conical inner surface terminating in a flat inner end, whereby the components inserted through said annular bottom member can be held in engagement with said inner end while said bottom member is held and said top member is rotated relative to said bottom member.

7. A connector for joining two or more components comprising a wire having first and second ends, and forming a loop therebetween, a top member and a bottom member wherein said first and second ends of said wire are joined to said top member and said bottom member, respectively, wherein the components may be placed through said loop, and wherein said members are rotated relative to the components which are held stationary, thereby constricting said loop around the components and binding the components together.

8. A connector for components to be joined comprising:
    an annular bottom member;
        a concave top member rotatably mountable on said annular bottom member and rotatively movable with respect to said annular bottom member; and
        a wire engageable with said top and bottom members for rotation therebetween to grip the components inserted through said bottom member into said top member, said top member defining an open end and having an annular flange about said open end thereof and having a plurality of serrations formed about the periphery of said flange;
    a recess formed in the upper surface of said bottom member to receive said flange of said top member; and
    a ratchet ring fixedly mounted in said recess and engageable with said serrations on said flange to permit rotation between said top member and said bottom member in one direction.

9. A connector as claimed in claim 8, wherein:
    said ratchet ring comprises an annular member having a plurality of vertical plates projecting upwardly from said annular member and having portions of said plates extending tangentially to said annular member to engage said serrations on said flange of said top member.

* * * * *